Patented Jan. 26, 1937

2,068,989

UNITED STATES PATENT OFFICE 2,068,989

SULPHONIC ACIDS OF ANTHRA-PYRIMIDINES

Karl Koeberle and Otto Schlichting, Ludwigshafen-on-the-Rhine, Germany, assignors to General Aniline Works, Inc., New York, N. Y., a corporation of Delaware No Drawing. Application December 22, 1933, Serial No. 703,669. In Germany December 24, 1932

5 Claims. (Cl. 260—32)

The present invention relates to dyestuffs of the anthrapyrimidine series and a process of producing same.

We have found that valuable dyeings are obtained by treating animal fibres such as wool, silk, leather and skins in a non-alkaline bath with a sulphonic acid of an anthrapyrimidine. The term "an anthrapyrimidine" is meant to include anthrapyrimidine itself and its simple substitution products. One, two or more sulphonic acid groups may be present in the said dyestuffs. Many of the said compounds yield on wool dyeings of greenish-yellow shades. Usually the dyeings are very strong and of a considerable clarity of shade. Very valuable dyeings are obtained by means of those of the said dyestuffs which contain at least one unsubstituted NH₂-group and those which are substituted on the py-C-atom by an aromatic radicle e. g. a phenyl, a naphthyl or phenylamino group. The sulphonic acid group or groups may be present in the anthrapyrimidine nucleus or in a substituent connected therewith.

The anthrapyrimidine sulphonic acids may be obtained for example by treating α-aminoanthraquinone sulphonic acids with acid amides such as formamide, cyanamide or with nitriles or by condensation of amidines of α-aminoanthrapyrimidine sulphonic acids in a manner analogous to the processes described in the applications Ser. Nos. 586,692, filed January 14th, 1932, 628,440, filed August 11th, 1932, 628,441, filed August 11th, 1932, 683,402, filed August 2nd, 1933, 663,646, filed March 30th, 1933 and 690,954, filed September 25th, 1933. Derivatives of anthrapyrimidine the sulphonic acids of which are suitable dyestuffs are the simple substitution products such as amino, alkoxy, alkyl, cycloalkyl, aralkyl, aryl and arylamino anthrapyrimidines and also anthradipyrimidines and their substitution products. The said sulphonic acids may also be prepared by sulphonating anthrapyrimidines for example by warming with sulphuric acid or by treatment with fuming sulphuric acid, chlorosulphonic acid, if desired with the addition of boric acid, mercury or similarly catalytically acting substances. A further method of preparing sulphonic acids of the kind defined consists in treating anthrapyrimidines with salts of chlorosulphonic acid, for example with sodium chlorosulphonate, if desired, while adding indifferent diluents such as carbon tetrachloride. Furthermore the sulphonic acid group may be introduced into the anthrapyrimidine molecule by exchange with suitable substituents which are present in the anthrapyrimidine, for example by heating halogenated or nitrated anthrapyrimidines with alkali metal or alkaline earth metal sulphites.

The dyeing of the animal fibres is effected in non alkaline, preferably in acid baths with the usual additions, for example while adding water-soluble salts such as Glauber's salt.

The following examples will further illustrate the nature of the present invention but the invention is not restricted to these examples. The parts are by weight.

Example 1

50 parts of 1.4-diaminoanthraquinone-2-sulphonic acid are heated in 200 parts of nitrobenzene together with 200 parts of formamide and 5 parts of ammonium vanadate for a short time at 175° to 180° C. while stirring. At the beginning the solution is violet. As soon as it has become brown-yellow it is allowed to cool and 4-amino-1.9-anthrapyrimidine-sulphonic acid which is separated, is filtered off by suction. By distilling off the solvent, if desired under decreased pressure and/or with steam, further parts of the said compound can be obtained from the mother-liquor. The product dissolves in concentrated sulphuric acid giving a blue-red solution; with alkaline hydrosulphite solution it yields a brown vat; it dissolves in water or sodium acetate solutions giving clear yellow solutions.

Animal fibres such as wool are treated in an acid bath with the product whereby dyeings of yellow shades are obtained.

In an analogous manner from 1-amino-4-benzoylamino-anthraquinone-2-sulphonic acid (obtainable by partial acylation of 1.4-diamino-anthraquinone-2-sulphonic acid) py-C-phenyl-4-benzoylamino- 1.9 -anthrapyrimidine-2-sulphonic acid is obtained by boiling with phenylmethylimidechloride in nitrobenzene. The latter compound may also be obtained by heating 1-amino-4-benzoylaminoanthraquinone-2 -sulphonic acid with benzonitrile in the presence of hydrochloric acid and cuprous chloride in nitrobenzene.

From 1.4-diaminoanthraquinone-2-sulphonic acid and different nitriles valuable dyestuffs are obtained in an analogous manner; for example with benzonitrile in the presence of hydrochloric acid a py-C-phenyl-4-amino-1.9-anthrapyrimidine-β-sulphonic acid is obtained, with acetonitrile a py-C-methyl-4-amino-1.9-anthrapyrimidine-β-sulphonic acid and with cyanamide in nitrobenzene in the presence of cuprous chloride a py-C-amino-4-amino-1.9-anthrapyrimidine-β-sulphonic acid. All these substituted 4-amino-1.9-anthrapyrimidine sulphonic acids dye the animal fibre from acid baths yellow shades.

*Example 2*

10 parts of 4-amino-py-C-phenyl-1.9-anthrapyrimidine are dissolved in a mixture of 100 parts of sulphuric acid monohydrate and 10 parts of fuming sulphuric acid containing 23 per cent of free sulphur trioxide. The mixture is heated at 150° to 160° C. until a sample clearly dissolves in hot water, at least after the addition of some sodium acetate. Then the melt is poured into ice-water, filtered by suction and the filtering residue washed with sodium chloride solution and squeezed. The reaction product is an orange-red powder which according to analysis is a monosulphonic acid of 4-amino-py-C-phenyl-1.9-anthrapyrimidine. By adding sodium acetate or caustic soda solution the yellow sodium salt of the said acid which is readily soluble is obtained.

The product dyes animal fibres such as wool from acid baths yellow shades of good fastness.

In an analogous manner the sulphonic acids of 2-amino-py-C-phenyl-1.9-anthrapyrimidine and 5-amino-py-C-phenyl-1.9-anthrapyrimidine may be obtained. The former dyes wool orange-red shades, the latter red shades.

*Example 3*

10 parts of 5-para-toluido-1.9-anthrapyrimidine are dissolved in 100 parts of sulphuric acid monohydrate, the solution being heated at 100° to 105° C. until a sample dissolves clearly in hot water, at least after the addition of sodium acetate. Then the mass is poured into ice-water and worked up in the usual manner whereby a sulphonic acid of 5-para-toluido-1.9-anthrapyrimidine is obtained.

The product dyes wool from acid baths violet shades of good fastness properties.

In a similar manner by sulphonating py-C-anilido-1.9-anthrapyrimidine (obtainable by heating py-C-chlor-1.9-anthrapyrimidine with aniline) a sulphonic acid is obtained which dyes the animal fibre from acid baths blue-red shades.

*Example 4*

10 parts of dichlor-4-amino-1.9-anthrapyrimidine (obtainable by treating 4-amino-1.9-anthrapyrimidine with sulphurylchloride in nitrobenzene in the presence of iodine) are heated in an autoclave with a solution of 100 parts of potassium sulphite in 500 parts of water for from 10 to 15 hours at 110° to 120° C. The mass is allowed to cool and filtered by suction, the filtering residue extracted several times with hot water; sodium chloride is added to the filtrates and the precipitate produced thereby is filtered off by suction.

The sulphonic acid obtained dyes the animal fibre from acid baths strong clear green yellow shades.

In an analogous manner from 5-amino-brom-1.9-anthrapyrimidine and sodium sulphite a sulphonic acid is obtained which dyes wool from acid baths red shades.

*Example 5*

10 parts of 4-benzoylamino-1.9-anthrapyrimidine are dissolved in 100 parts of a 23 per cent fuming sulphuric acid and warmed at from 60° to 70° C. until a sample dissolves clearly in hot water, at least after the addition of some sodium acetate. The mass is poured into ice-water, filtered by suction and the yellow filtering residue is washed with sodium chloride solution and dried. A yellow powder is obtained which according to analysis contains a monosulphonic acid of 4-benzoylamino-1.9-anthrapyrimidine.

The product dyes wool from acid baths greenish-yellow shades of good fastness properties.

The sulphonic acids obtainable in an analogous manner from ortho-, meta- or para-4-toluylamino-1.9-anthrapyrimidine, 4-meta-methoxybenzoylamino-1.9-anthrapyrimidine and 4-α- and 4-β-naphthoylamino-1.9-anthrapyrimidine dye wool from acid baths greenish-yellow shades.

The sulphonic acids from 5-α- and 5-β-naphthoylamino-1.9-anthrapyrimidine yield dyeings of orange-brown shades on wool.

*Example 6*

20 parts of 1.9.4.10-anthra-di py-C-meta-tolyl pyrimidine (obtainable by heating 1.4-dimetatoluylaminoanthraquinone by heating with ammonia in phenol at 150° C.) are dissolved in a mixture of 200 parts of sulphuric acid monohydrate and 20 parts of a 23 per cent fuming sulphuric acid and heated at 140° to 150° C. until a sample clearly dissolves in water. The mass is worked up in the usual manner.

The sulphonic acid obtained is a yellow powder dyeing wool from acid baths greenish-yellow shades.

*Example 7*

10 parts of a 4-amino-py-C-β-naphthyl-1.9-anthrapyrimidine (obtainable by treating 1-amino-4-β-naphthoyl-aminoanthraquinone with ammonia in the presence of phenol at 150° C. under a pressure of 8 atmospheres) are dissolved in 100 parts of a 23 per cent fuming sulphuric acid. The solution is warmed for a short time at 40° to 45° C. until a sample clearly dissolves in water upon the addition of sodium acetate.

The sulphonic acid obtained by working up the reaction mass in the usual manner dyes wool from acid baths golden yellow shades of good fastness properties.

*Example 8*

1-α-naphtholyamino-4-para-toluidoanthraquinone is treated in phenol with ammonia under a pressure of about 8 atmospheres at 150° C. and the py-C-α-naphthyl-4-para-toluido-1.9-anthrapyrimidine obtained is sulphonated by means of sulphuric acid monohydrate, if desired with the addition of some fuming sulphuric acid, at about 50° C.

By starting with the corresponding β-naphthoylamino compound a sulphonic acid of py-C-β-naphthyl-4-para-toluido-1.9-anthrapyrimidine is obtained.

In the following table there are given the shades of dyeings obtainable on animal fibres with the two dyestuffs described above and with some further compounds which may be prepared in an analogous manner by varying the initial materials.

| Dyestuff | Shade on wool |
|---|---|
| Py-C-phenyl-4-para-toluido-1.9-anthraprimidine sulphonic acid. | Scarlet-red. |
| Py-C-phenyl-4-anilido-1.9-anthrapyrimidine sulphonic acid. | Red. |
| Py-C-α-naphthyl-4-para-toluido-1.9-anthrapyrimidine sulphonic acid. | Orange-yellow. |
| Py-C-β-naphthyl-4-para-toluido-1.9-anthrapyrimidine sulphonic acid. | Scarlet-red. |
| Py-C-phenyl-4-para-anisoyl-1.9-anthrapyrimidine sulphonic acid. | Scarlet-red. |

What we claim is:—

1. An anthrapyrimidine sulphonic acid containing at least one $NH_2$-group.

2. The dyestuff being a sulphonic acid of py-C-α-naphthyl-4-para-toluido-1.9-anthrapyrimidine and dyeing wool orange-yellow shades.

3. The dyestuff being a sulphonic acid of py-C-β-naphthyl-4-para-toluido-1.9-anthrapyrimidine and dyeing wool scarlet-red shades.

4. An anthrapyrimidine sulphonic acid.

5. An anthrapyrimidine sulphonic acid corresponding to the general formula:

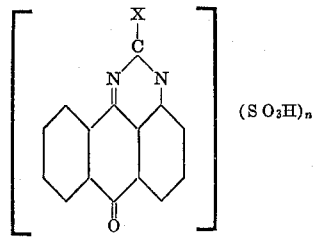

in which $n$ stands for a whole number up to three and X for a substituent selected from the class consisting of the alkyl, aryl, amino, arylamino groups in which the aryl groups contain up to two condensed carbocyclic rings.

KARL KOEBERLE.
OTTO SCHLICHTING.